(12) United States Patent
Calderon et al.

(10) Patent No.: US 7,998,236 B2
(45) Date of Patent: Aug. 16, 2011

(54) ADVANCED METHOD FOR PROCESSING FUELS

(76) Inventors: Albert Calderon, Bowling Green, OH (US); Terry James Laubis, Portage, OH (US); Richard Owen McCarthy, Strongsville, OH (US)

(*) Notice: Subject to any disclaimer, the term of this patent is extended or adjusted under 35 U.S.C. 154(b) by 466 days.

(21) Appl. No.: 12/228,841

(22) Filed: Aug. 18, 2008

(65) Prior Publication Data

US 2010/0037667 A1 Feb. 18, 2010

(51) Int. Cl.
*C01C 3/00* (2006.01)
*C05C 11/00* (2006.01)

(52) U.S. Cl. .......... 71/54; 48/197 R; 48/210; 423/437.1; 423/351; 423/365; 423/384

(58) Field of Classification Search ................ 48/197 R, 48/210; 71/54; 423/365, 384, 351, 437.1
See application file for complete search history.

(56) References Cited

U.S. PATENT DOCUMENTS

| | | | | |
|---|---|---|---|---|
| 1,306,862 A | * | 6/1919 | Starke | 423/354 |
| 3,928,444 A | * | 12/1975 | Kamada et al. | 564/125 |
| 3,966,633 A | * | 6/1976 | Friedman | |
| 4,145,274 A | * | 3/1979 | Green et al. | |
| 4,177,120 A | * | 12/1979 | Zenty | |
| 4,243,489 A | * | 1/1981 | Green | |
| 4,265,868 A | * | 5/1981 | Kamody | |
| 4,592,762 A | * | 6/1986 | Babu et al. | |
| 4,927,430 A | * | 5/1990 | Calderon | |
| 5,145,490 A | * | 9/1992 | Sadowski | |
| 5,236,470 A | * | 8/1993 | Levin | |
| 5,389,117 A | * | 2/1995 | Firey | |
| 5,900,224 A | * | 5/1999 | Fujimura et al. | 423/359 |
| 5,980,858 A | * | 11/1999 | Fujimura et al. | 423/655 |
| 6,005,149 A | * | 12/1999 | Bishop | 585/241 |
| 6,063,355 A | * | 5/2000 | Fujimura et al. | 423/359 |
| 6,863,878 B2 | * | 3/2005 | Klepper | 423/650 |
| 7,169,197 B2 | * | 1/2007 | Serio et al. | 48/61 |
| 2004/0111968 A1 | * | 6/2004 | Day et al. | 48/197 FM |
| 2006/0185245 A1 | * | 8/2006 | Serio et al. | |
| 2008/0040975 A1 | * | 2/2008 | Calderon | |

* cited by examiner

*Primary Examiner* — Wayne Langel

(57) ABSTRACT

An advanced method for processing a solid feedstock such as coal and a liquid feedstock such as bitumen wherein gases produced from such fossil fuel feedstocks are divided in a way as to polygenerate various by-products which includes the conversion of a waste gas (flue gas) containing nitrogen ($N_2$) and carbon dioxide ($CO_2$) generated from the combustion of said gases to produce an intermediate made of carbon (C) and nitrogen ($N_2$) in the form of cyanogen which in turn is converted to a fertilizer such as oxamide. This approach obviates the necessity of $CO_2$ capture and storage in a geologic formation. Besides the making of a fertilizer from a waste gas containing $N_2$ and $CO_2$, the other by-products can be power in the form of electricity and/or steam from a lean gas and liquid transportation fuel like methanol/gasoline, or chemicals from a hydrogen rich gas. The method is applicable to utility as well as to industry. This approach provides a comprehensive solution with respect to the use of energy from fossil fuels in an efficient and environmentally acceptable manner.

46 Claims, 2 Drawing Sheets

ADVANCED METHOD FOR PROCESSING FUELS

This invention is related to the pending patent application of the herein applicants, having Ser. No. 11/880,708, filed on Jul. 24, 2007, whose title is "Method and Apparatus for Gasifying Solids." Specifically, this invention emphasizes the benefits of generating multi-products from fossil fuel resources, such as coal as a solid feed and such as bitumen as a liquid feed that enhance the value of the resource by addressing various needs of consumers, investors, industrialists, environmentalists, and local, state, and federal governments.

BACKGROUND

In a solicitation for proposals posted on Jun. 24, 2008, by the United States Department of Energy (DOE) covering advanced, clean coal-based power generation technology, the solicitation (on page 6, paragraphs 3 and 4 of Section B, titled "MISSION NEED AND BACKGROUND") stated the following: "Changes in market realities have altered the energy/power and environmental landscape. These changes include significant escalation in material and labor costs for new power plants, a growing near-term interest in the promulgation of regulations for carbon dioxide ($CO_2$) emissions, and a growing trend by States to require coal plants to consider CCS. These changes, in particular those related to atmospheric emissions of $CO_2$, present great environmental changes to the future of fossil-based power generation, pose serious potential barriers to the power industry to finance and build new coal-based generation capacity, and underscore the need to quickly demonstrate the commercial viability of a new generation of advanced coal-based power systems.

The Energy Information Administration forecasts the need for more than 200 gigawatts of new power generation capacity for the U.S. by 2030. In response, the utility industry has proposed a number of new coal projects, including several that would utilize IGCC technology. However, due to challenges mentioned above, plans for many new coal-based power plants are being abandoned or postponed. So, while there is a growing demand for electricity, there is also a critical need to accelerate the commercial demonstration of advanced coal-based power technology that can economically meet a carbon-constrained future." The term "CCS" stands for Carbon Capture and Storage, and the term "IGCC" stands for Integrated Gasification Combined Cycle. However, these challenges mentioned above are not only limited to coal-based power but also in the field of liquid hydrocarbons as there is evidence that petroleum crude oil is becoming more difficult to discover.

OBJECTIVES

In order to overcome the technical and economic challenges described above, the main object of this invention is to polygenerate several by-products which have great value in the marketplace in order to be in a position to absorb the escalation in materials and labor cost.

Another object of the present invention is the integration of the various components in such a way as to provide a streamlined configuration that results in the components being functionally compatible in order to increase efficiency.

Further, another object of this invention is to address the issue of carbon capture and storage from flue gases containing carbon dioxide ($CO_2$) by avoiding the separation of the $CO_2$ from the nitrogen ($N_2$) in the flue gas produced during the combustion of a fossil fuel such as coal and oil-derived fuels with air, and using such flue gas as a feedstock to make a useful by product in the form of a low-cost fertilizer.

Still another object of the present invention is to accelerate the commercial application of integrated gasification combined cycle with provisions that prevent the emission of $CO_2$ by providing an approach based on simplification of the various steps that achieve an elegant solution beyond just the generation of electric power from a fossil-based feedstock such as coal and petroleum-derived liquid hydrocarbons but also provide the capability of producing a clean, hydrogen-containing rich gas which is suitable for the making of chemicals, liquid fuels, gaseous fuels, and fertilizer.

Therefore, another object of this invention is to provide an elegant solution that eliminates the need for carbon capture and storage of $CO_2$ which requires the monitoring of such storage for a great number of years following the injection of the $CO_2$ into special geologic formations which necessitates continuous monitoring, thus creating a costly legacy.

Further still, another object of this invention is to provide an approach that is profitable by virtue of the various valuable by products co-produced that can justify the high investment cost for facilities, resulting in growth that responds to an expanding need of consumers.

It is still another object of this invention to create, by way of polygeneration such that each polygenerated product is produced as a below-market cost, an economic surplus that can result in new revenue streams to governmental units through excise taxation, while yet delivering dramatically lowered consumer prices for fuels and especially transportation fuels, electric power, and fertilizer.

It is yet another object of this invention to polygenerate fertilizer with other energy products such that gasification can be practiced economically at a variety of manufacturing plant scales, including large- and smaller-scale plants, with the fertilizer essentially serving as a supplementary income that makes small-scale gasification economically feasible through converting greenhouse gases into a saleable product having a large-volume agricultural application.

It is therefore another object of this invention to provide a method which produces a clean lean gas for the efficient generation of power with other by-products from flue gas produced when fossil fuels, whether in solid or in liquid form, are combusted while at the same time producing valuable by-products.

These and other objects of the instant invention will become more apparent to those skilled in the art to which this invention pertains and particularly from the following description and appended claims.

Reference is now made to the accompanying drawings which form a part of this specification wherein like reference characters designate corresponding parts. It is to be understood that the embodiments shown herein are for the purpose of description and not for limiting the scope of the invention.

DETAILED DESCRIPTION OF THE DRAWINGS

Figure 1:
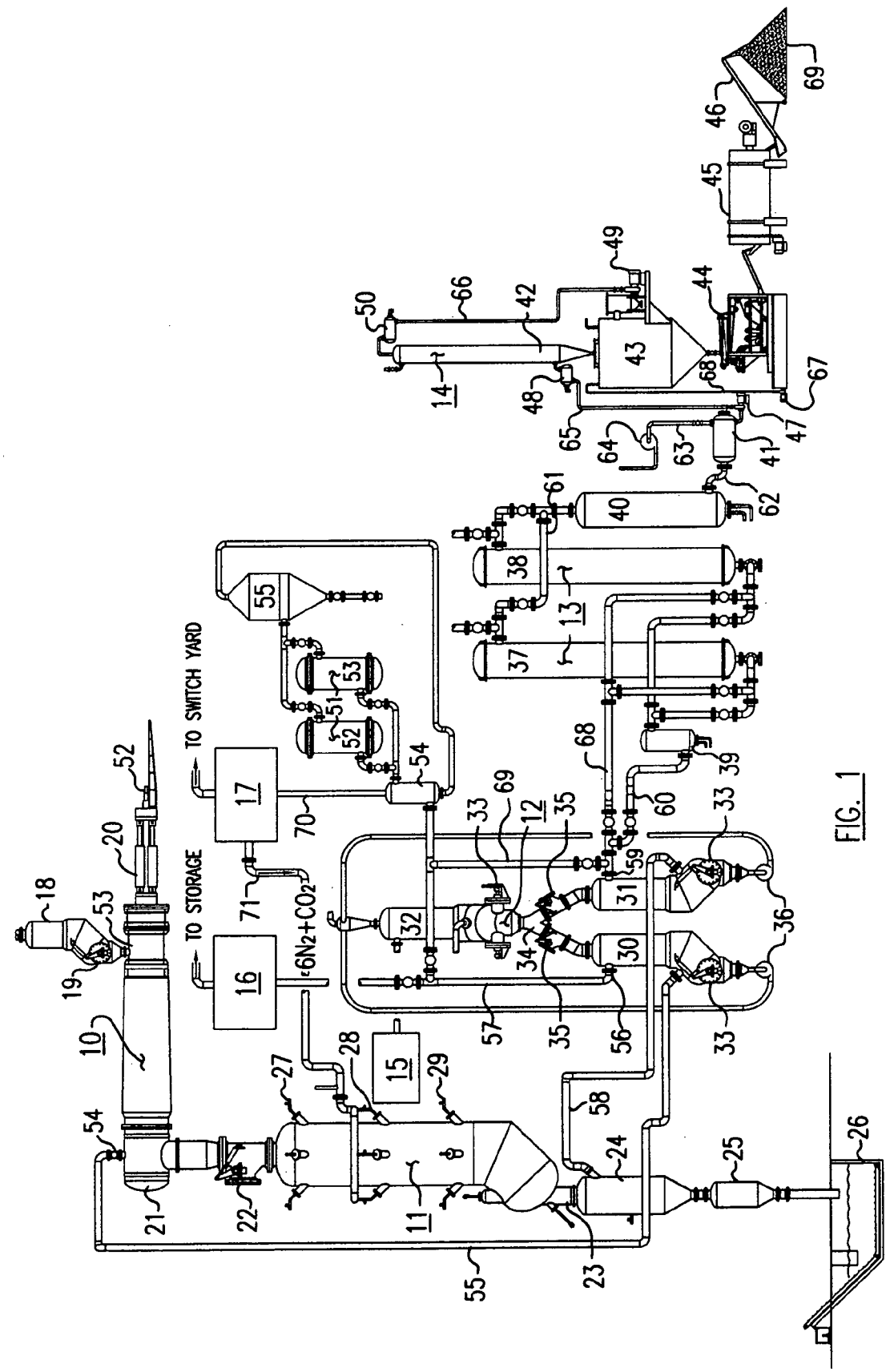
FIG. 1 is a flow diagram which illustrates the various components to carry the steps to achieve the objects herein described and by way of example using coal as a fossil fuel; the coal may be replaced by any other solid fossil fuel such as coke, bituminous or sub-bituminous coal, petroleum coke, lignite, biomass, etc. These components comprise charging; devolatilizing; gasifying; slagging; hot gas cleanup, mercury capture, chemical production, power generation, and directing the flue gas containing $N_2$ and $CO_2$ from power generation for reduction of $CO_2$ into CO, and conversion of CO into an intermediate (cyanogen, $C_2N_2$) which, in turn, is converted to a fertilizer.

Referring to FIG. 1, numeral 10 represents a devolatilizer, and numeral 11 represents a gasifier. The gas cleanup is represented by numeral 12, and numeral 13 represents a pair of cyanogen reactors. Numeral 14 represents the oxamide maker, and numeral 15 is the sulfur plant. Numeral 16 is the methanol/gasoline plant, and numeral 17 represents the electric power plant.

Referring to reactor 10, it possesses a coal delivery hopper marked by numeral 18 which is equipped with feeder 19. A charging mechanism denoted by numeral 20 is used to charge the coal into devolatilizer 10. A 90° elbow marked by numeral 21 connects devolatilizer 10 to gasifier 11. A valve denoted by numeral 22 is disposed to the vertical leg of elbow 21. At the bottom of gasifier 11 a spool denoted by numeral 23 connects to slag quencher 24, and below quencher 24 a lockhopper denoted by numeral 25 is situated from which the slag is fed to a collection tank marked by numeral 26. Injection points to gasifier 11 are provided at the top marked by numeral 27, at the middle by numeral 28 and at the bottom by numeral 29.

Gas cleanup 12 is made up of three vessels, marked by numerals 30, 31, and 32. Vessel 30 cleans the hydrogen rich gas; vessel 31 cleans the nitrogen ($N_2$)/carbon monoxide (CO) gas; and vessel 32 serves to regenerate the sorbent that absorbs the sulfur. All three vessels are equipped with feeders denoted by numeral 33. Vessel 32 interconnects with vessels 30 and 31 via the inverted Y-pipe that is marked by numeral 34, which is equipped with diversion valves 35. Gas cleanup 12 is equipped with pneumatic transporters 36 to convey the sorbent from vessels 30 and 31 to regenerator 32.

Cyanogen reactors 13 comprise in turn reactor 37 and reactor 38 with gas temperature moderator denoted by numeral 39 and chiller-liquefier which is denoted by numeral 40, downstream of which is located separator 41 which separates the liquefied cyanogen from the unreacted gases.

Downstream of separator 41, oxamide maker 14 is located. It consists of reactor 42, settling tank 43, filter press 44, drier 45, and stacker 46. Pump 47 is provided to separator 41 to pump the liquefied cyanogen to evaporator 48, and pump 49 serves to circulate the liquid catalyst to the top of reactor 42; a heater denoted by numeral 50 serves to adjust the temperature of the liquid catalyst.

A system for the removal of mercury for the $N_2$/CO gas by means of activated carbon is provided and marked by numeral 51. This system is made up of filter bed 52 and filter bed 53. Upstream of filter beds 52 and 53 a heat exchanger marked by numeral 54 is disposed, and downstream of the filter beds a bag-house denoted by numeral 55 is provided.

Figure 2:
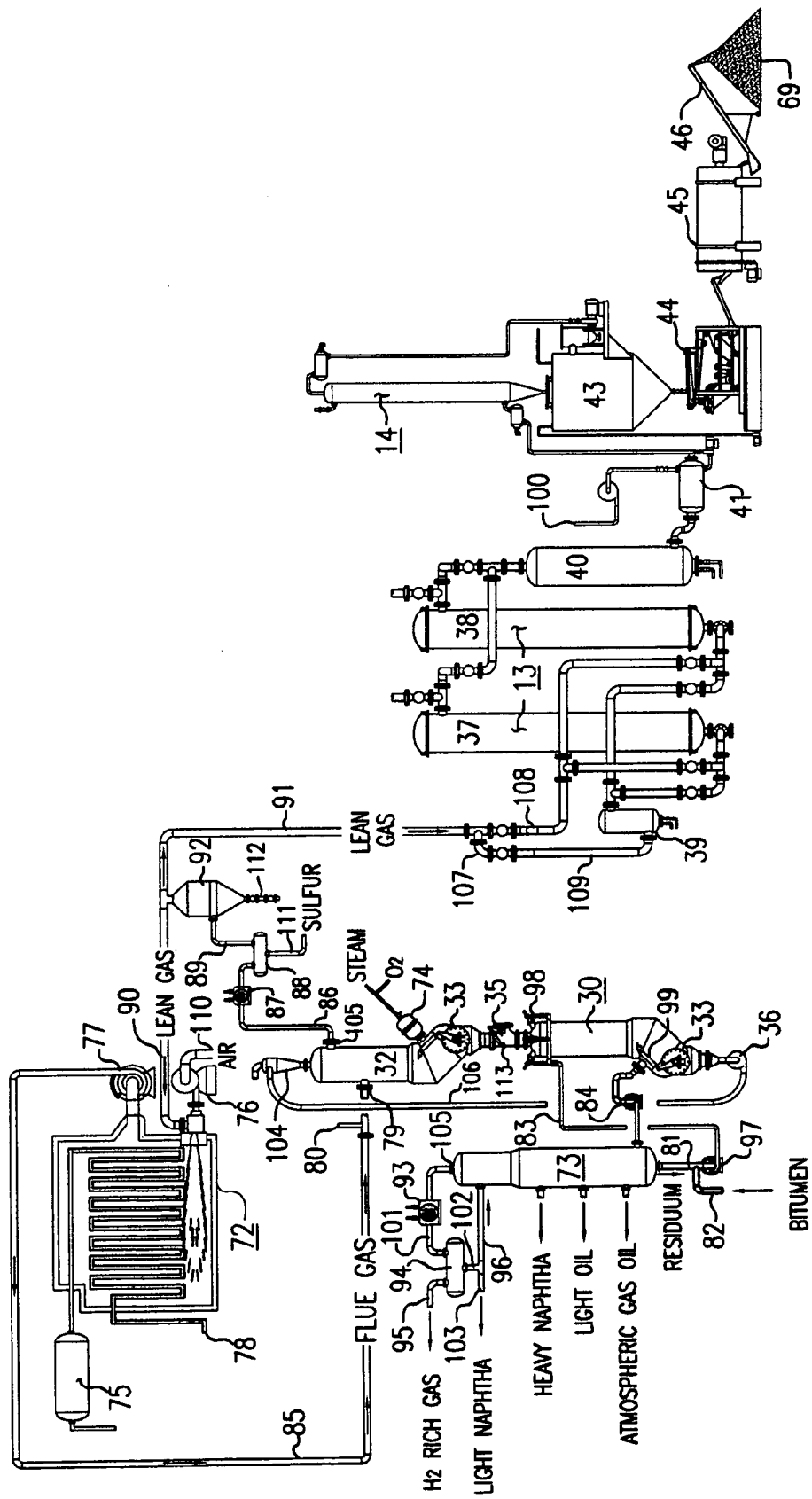
FIG. 2 is a flow diagram which illustrates the various components to carry the steps to achieve the objects herein described and by way of example using a fossil fuel in liquid form such as bitumen; other liquid feeds such as light crude oil, heavy crude oil, oil from oil sands, oil from shale, and residuum may also be used as feed. These components comprise spraying the bitumen over a hot sorbent in order to crack the hydrocarbons while simultaneously to desulfurize the feed while depositing and impregnating carbon in the sorbent which is subsequently regenerated in a regenerator. The regenerator also serves for converting a flue gas containing $CO_2$ into CO which in turn is used for the formation of an intermediate ($C_2N_2$) that is processed into a fertilizer.

In referring to FIG. 2, it is to be noted that the facilities illustrated by numerals 13 and 14 are the same as those shown in FIG. 1. Also, vessels 30 and 32 are the same as those shown in FIG. 1. Since these facilities were described above in detail, their description will be omitted to avoid redundancy. The main addition to accommodate the processing of the bitumen, a fractionator denominated by numeral 73, is provided. In addition, a boiler marked by numeral 72 is provided, which is followed by a steam drum marked by numeral 75. Other equipment which is not needed when processing a liquid is obviated in FIG. 2.

Operation

Referring to FIG. 1 and assuming the process is running at steady state, coal hopper 18 supplies coal to feeder 19 which in turn drops a measured amount of coal into charging chamber 53, and charging mechanism 20 force feeds the coal into devolatilizer 10. An injector marked by numeral 52 injects a measured amount of an oxygen-containing gas into the charged coal causing the combustion of a small portion of the coal under suppressed conditions, releasing a sufficient quantity of thermal energy which causes the devolatilization of the coal and thus converting the coal into a hydrogen ($H_2$) rich gas according to reaction #1.

(1)

This $H_2$ rich gas leaves devolatilizer 10 via port 54 and is directed to hot gas cleanup vessel 30 by means of pipe 55, where the gas is desulfurized and tars, light oil and other hydrocarbons are thermally cracked against a hot sorbent descending from regenerator 32 to result in a clean $H_2$ rich gas leaving vessel 30 via port 56 with pipe 57 directing it to methanol plant 16. This clean $H_2$ rich gas may be converted into methanol as a final product or may be converted further into gasoline via the methanol-to-gasoline process of Exxon-Mobil. In the event that it is desired not to produce methanol or gasoline, the $H_2$ rich gas may be used as a feedstock to make a chemical or a variety of chemicals, or it may still be used as a clean fuel or as a source of $H_2$.

Referring now to gasifier 11, hot char pushed out from devolatilizer 10 drops into the top of gasifier 11 through elbow 21 with valve 22 controlling the feed to maintain a relatively fixed level in gasifier 11; valve 22 also serves to maintain the pressure differential between devolatilizer 10 and gasifier 11. The reactions that take place in gasifier 11 comprise reactions #2 and #3, with reaction #2 taking place at the top of gasifier 11 and reaction #3 towards the bottom of gasifier 11.

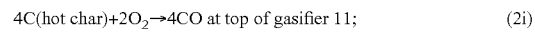

4C(hot char)+2O$_2$→4CO at top of gasifier 11; (2i)

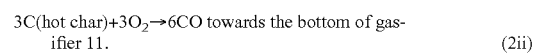

3C(hot char)+3O$_2$→6CO towards the bottom of gasifier 11. (2ii)

Reaction #3 which comprises the location where the flue gas is preferably injected at point 28 of gasifier 11, takes place at about mid-point between injection point 27 and injection point 29. Since the $N_2$ content in the flue gas is 6 times greater than the $CO_2$, Reaction #3 which deals with the reduction of the $CO_2$ into CO is as follows:

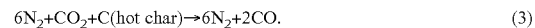

6N$_2$+CO$_2$+C(hot char)→6N$_2$+2CO. (3)

It is to be noted that the injection of gases at points 27, 28, and 29 are configured in such a way as to distribute the gases circumferentially via manifolds into gasifier 11.

The injection of the oxygen containing gas at the top of gasifier 11 serves to raise the temperature of the hot char to such an extent as to insure that all the $CO_2$ contained in the flue gas injected into gasifier 11 is fully reduced to CO. The injection of the oxygen containing gas towards the bottom of gasifier 11 serves to consume the carbon in the char to produce a low Btu gas (lean gas) and at the same time melt the ash contained in the char into a molten slag that flows through spool 23 and into quencher 24 and thence through lockhopper 25. The solidified slag is then discharged into the atmosphere. Spool 23 which is common for the flow of the molten slag and for the flow of the hot lean gas insures the prevention of the slag from freezing at the bottom of gasifier 11 by virtue of the elevated temperature of the lean gas being above the melting point of the slag. The lean gas, after emerging from gasifier 11, is directed to cleanup vessel 31 via pipe 58; it emerges as clean gas devoid of sulfur from port 59 of vessel 31 and is then directed by means of pipe 60 to temperature moderator 39 prior to entering at the bottom of reactor 37 for conversion to cyanogen ($C_2N_2$) which is represented by reaction #4.

$$6N_2 + 2CO(\text{reaction \#3}) + 10CO(\text{reactions}(\#2i) \text{ and } (\#2ii)) \rightarrow 6C_2N_2 + 6O_2 \qquad (4)$$

In order to prevent the 6 $O_2$ from oxidizing the 6 $C_2N_2$, the temperature in cyanogen reactor 37 is maintained below the ignition point of $C_2N_2$. The six (6) moles of $C_2N_2$ and the six (6) moles of $O_2$ are directed from the top of reactor 37 via pipe 61, to chiller/liquefier 40 in order to liquefy the $C_2N_2$. The $C_2N_2$ leaves chiller/liquefier 40 as a liquid together with the $O_2$ as a gas in order to efficiently achieve separation in separator 41 with pipe 62 interconnecting chiller/liquefier 40 to separator 41. As the $O_2$ gas leaves separator 41 via pipe 63, its pressure is increased by means of booster compressor 64 for appropriate delivery. Since six (6) moles of $O_2$ are generated in reaction #4, the 6 $O_2$ moles are preferably divided as follows: One (1) $O_2$ mole is delivered to the devolatilizer at point 52, two (2) $O_2$ moles to the top of gasifier 11 at point 27, and three (3) $O_2$ moles towards 5 the bottom of gasifier 11 at point 29 for every six (6) moles of $C_2N_2$.

The $C_2N_2$, having been isolated from the $O_2$ and still in liquid form, is pumped by means of pump 47 via pipe 65 to vaporizer 48 to convert the $C_2N_2$ from a liquid back to a gas for injection at the bottom of oxamide reactor 42 to be hydrated while the liquid catalyst is circulated through reactor 42 by means of pump 49. This liquid catalyst is preheated by means of heater 50 prior to being sprayed at the top of reactor 42. The $C_2N_2$ in gaseous form rising in reactor 42 while the catalyst in liquid form flowing downward in reactor 42, provide an intimate co-action between the two to cause the efficient formation of the oxamide as a thick catalyst containing slurry which drops into settling tank 43. The reaction taking place in the formation of the oxamide is according to reaction #5.

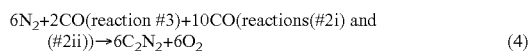

$$6C_2N_2 + 12H_2O \xrightarrow{\text{catalyst}} 6(CONH_2)_2 \qquad (5)$$

The excess catalyst in liquid form in settling tank 43 is pumped by means of pump 49 to the top of reactor 42 with pipe 66 connecting pump 49 to heater 50. The semi-solid thick slurry is then fed to filter press 44 where the excess liquid catalyst is pressed out of the thick slurry to be recycled, by means of pump 67, to the top of settling tank 43 using pipe 68 as a conduit. The pressed oxamide is next directed to drier 45, where it is dehydrated and thence discharged into storage pile 69 by means of stacker conveyor 46, whence it is made available for shipment to customers as a valuable fertilizer by-product made from flue gas—a waste.

It is to be noted that two cyanogen reactors (37 and 38) are provided in order to have the capability of having reactor 38 as a regenerator when reactor 37 is forming the $C_2N_2$ and vice-versa, when reactor 38 is being used as the reactor to form the $C_2N_2$ reactor 37 is used as the regenerator. A configuration of piping and valves is provided to enable the switching of feed and product as illustrated in FIG. 1.

It is also to be noted that a system of piping and valves is also provided for the capability to remove mercury from the gas by either vessel 53 or 54, depending upon which one is removing mercury and which one is being serviced.

Reference is now made to the production of methanol/gasoline by means of the $H_2$ rich gas and the generation of electric power by means of the lean gas. The $H_2$ rich gas after cleanup in vessel 30, is directed to plant 16 which represents the facility to produce the methanol/gasoline using pipe 57 to interconnect clean-up vessel 30 to plant 16. The lean gas after cleanup in vessel 31 is bifurcated in order to divide it into two streams—stream 68 and stream 69—with stream 68 leading a portion of the lean gas for the formation of $C_2N_2$ and stream 69 leading the remainder of the lean gas to heat exchanger 54 whence the lean gas, after removal of mercury, is reheated and fed to power generation plant 17 by means of stream 70. The flue gas ($6N_2+CO_2$), leaving power plant 17, flows by means of stream 71 to point 28 of gasifier 11 for the conversion of $CO_2$ into CO by reacting with hot char within gasifier 11 at a temperature of about 2000° F. As needed, some steam may be added to gasifier 11 at selected injection points to moderate the temperature within it. It is also to be noted that in plant 16, methane ($CH_4$) may be made instead of methanol or gasoline by making use of the $H_2$ rich gas.

Referring now to FIG. 2 to describe the operation as it relates to the processing of the fossil fuel in the form of a bitumen and using the by-products produced from it, the bitumen is fed into intake 82 to mix with the residuum flowing out of fractionator 73 via pipe 81. Both the bitumen and the residuum as a mix are pumped to the top of reactor vessel 30 by means of pump 97 using pipe 83, to be sprayed over the hot sorbent within the top of vessel 30 with the spraying assembly denoted by numeral 98. The hot regenerated sorbent which is in pebble form descends from the bottom of regenerator 32 into the top of cracker-desulfurizer 30 via spool 113 within which control valve 35 is disposed.

As the bitumen is sprayed over hot (2000° F.) pebbles, the bitumen vaporizes into a gas with carbon being deposited on and into the pebbles which are made of lime (CaO). The CaO being porous and a very good absorber of sulfur, such as hydrogen sulfide ($H_2S$), two steps take place simultaneously: the cracking of the heavy hydrocarbons of the bitumen and the desulfurization of the vaporized bitumen. Such cracking and desulfurization with the loss of carbon to the sorbent pellets produces an upgraded volatile matter which flows co-currently downward with the movement of the pellets in the same direction. This approach provides more residence time for the volatile matter to contact the sorbent pellets.

The upgraded volatile matter leaves cracker-desulfurizer 30 via port 99 and is force fed into the bottom of fractionator 73 by means of pump 84. The volatile matter within fractionator 73 is split into fractions with the lighter fractions rising towards the top and the heavier fractions separating towards the bottom; this phenomena permits the fractions to leave at different levels depending on density such that the bitumen is broken down into a non-condensable $H_2$ rich gas at the very top of fractionator 73 and a heavy oil in the form of residuum at the bottom. The $H_2$ rich gas, which consists of mostly $H_2$ and some methane gas, is very valuable because it can be used as is, in a hydrocracker (not shown but known in the art of refining oil) to produce additional light liquid product from heavier fractions since the methane does not interfere in the hydrocracker's operation.

The fractions leaving fractionator 73 comprise light naphtha, heavy naphtha, light oils, and atmospheric gas oil, with the residuum at the bottom as mentioned above. Prior to the $H_2$ rich gas leaving via pipe 95 for hydrotreating, it exits from port 105 of fractionator 73; thence it is directed to heat exchanger 93 and fed to condenser 94. The gas then exits condenser 94 via pipe 102 which forms an inverted T in order to split the stream into two parts: the light naphtha which flows through pipe 103 and the heavier light naphtha which is returned to the top of fractionator 73 via pipe 96.

Referring now to regenerator 32, the pebble sorbent at the bottom of vessel 30 is fed by means of feeder 33 into pneumatic transporter 36 which blows the spent, carbon-impregnated, sulfidated sorbent via pipe 106 to the top of disengaging hopper 104 where the propelling gas leaves and the pebble sorbent drops into the top of regenerator 32. Burner 74, which is used for start up, also serves to provide the oxidant, preferably in the form of $O_2$ moderated with steam. The carbon on the sorbent is used as a fuel in the form of char which is combusted under suppressed conditions; the products of combustion rise in regenerator 32 and exit through port 105 as a CO-containing gas (lean gas) together with elemental sulfur vapor which is ducted by means of pipe 86 to heat exchanger 87 and into sulfur condenser 88 with the elemental sulfur leaving the condenser via pipe 111 and the lean gas being directed to baghouse 92 by means of pipe 89. As the lean gas emerges from baghouse 92, it is split into two parts: one part being directed to burner/blower assembly 76 via pipe 90 and the other part being directed to the cyanogen complex 13 via pipe 91 with connection made at junction 107 with pipe 109 leading to temperature moderator 39 and pipe 108 leading to the bottom of either vessel 37 or 38, depending upon the sequence of operation and regeneration.

Burner/blower assembly 76 provides the thermal energy to boiler 72 to raise steam, as illustrated. It is to be noted that the energy release from combustion of the lean gas generated by the burner/blower assembly is not only limited to raising steam, as it may be used in many other applications as in the generation of electric power from a gas turbine or in heating as in an industrial application. But by way of example, it is illustrated that the thermal energy release in this example is to raise steam in a boiler that would use air to provide the oxygen to aid in the combustion of lean gas produced from burning carbon in regenerator 32 wherein flue gas is processed, rather than being discharged into the atmosphere. This flue gas, which can also be called "waste gas" or "stack gas," has a composition of roughly six (6) $N_2$ and one (1) $CO_2$. The objective is to use this flue gas as a feedstock to be converted into a fuel or as a feedstock to make a chemical, one use of which is to convert the chemical to a fertilizer. In this example, it is to do both; namely, one part to make a fuel for boiler 72 and the other part to make a chemical in the form of cyanogen which is further processed into oxamide or into another fertilizer containing CO, $N_2$ and $H_2$, such as urea which is denominated chemically as $CO(NH_2)_2$.

Referring again to FIG. 2, the feed water to boiler 72 is introduced at point 78, and the water is converted into steam which is collected in steam drum 75. As a result from combusting the lean gas, the flue gas formed is sucked from the boiler by the intake of blower 77 which forces the flue gas to be directed by pipe 85 into regenerator 32 via port 79 wherein the hot, glowing carbon (a 2000° F. char) on and in the pebbles while being regenerated, provide the reducing agent which enables the conversion of the $CO_2$ in the flue gas into CO, according to equation #3 referred to earlier in this description. The $N_2$+CO (a lean gas) is thus converted from a flue gas into a fuel gas or a chemical in gas form by virtue of its $N_2$ content which is an ingredient in $N_2$-containing fertilizer and a reductant in the form of CO, both of them being the feedstock to make cyanogen which in turn is converted to oxamide $(CONH_2)_2$.

All in all, it is submitted that the foregoing disclosure demonstrates the technical approach to achieve the several objects described towards the beginning of this specification with special emphasis being applied to address the escalation in material and labor costs through simplification together with the near-term interest in the promulgation of regulation to control $CO_2$ rather than being emitted into the atmosphere.

We claim:

1. A method for processing a fuel containing hydrocarbons wherein said fuel or a portion thereof is converted to thermal energy while producing a waste gas made up of nitrogen ($N_2$) and carbon dioxide ($CO_2$), comprising the following steps:
producing a hot char by devolatilizing said fuel;
reacting said waste gas containing said $N_2$ and said $CO_2$ with a portion of said hot char to cause the conversion of said $CO_2$ to carbon monoxide (CO) by using said hot char as a reductant to form a $N_2$/2CO gas;
adding an oxygen-containing gas to react with the remaining portion of said hot char under suppressed combustion conditions to gasify the carbon (C) in said char to form additional CO which increases the CO content in said $N_2$/2CO gas to result in a newly formed $N_2$/2CO gas with an increased ratio of CO in relation to $N_2$;
cleaning said newly formed $N_2$/2CO gas;
feeding the cleaned, newly formed $N_2$/2CO gas through a solid catalyst to produce a compound of carbon (C) and nitrogen ($N_2$); and
feeding said compound of C and $N_2$ through a liquid catalyst to convert it into a fertilizer.

2. The method as set forth in claim 1 wherein said compound of C and $N_2$ is cyanogen which is denominated chemically as $C_2N_2$.

3. The method as set forth in claim 1 wherein the step of feeding said compound of C and $N_2$ through a liquid catalyst to convert it into a fertilizer consisting of CO, $N_2$, and $H_2$.

4. The method as set forth in claim 3 wherein said fertilizer is characterized as being oxamide which is denominated chemically as $(CONH_2)_2$.

5. The method as set forth in claim 1 wherein the step of producing a hot char by devolatilizing a fuel is further characterized by the step of recovering a hydrogen rich gas resulting from the devolatilization of said fuel.

6. The method as set forth in claim 5 wherein the step of recovering the hydrogen rich gas resulting from the devolatilization of said fuel is further characterized by the step of subjecting said gas to a cleanup to obtain a clean hydrogen rich gas.

7. The method as set forth in claim 6 wherein the step of subjecting said gas to a cleanup to obtain a clean hydrogen rich gas is further characterized by the step of converting said hydrogen rich clean gas into a chemical.

8. The method as set forth in claim 7 wherein said chemical is methanol.

9. The method as set forth in claim 8 wherein said methanol is converted to gasoline.

10. The method as set forth in claim 7 wherein said chemical is synthetic natural gas.

11. The method as set forth in claim 1 wherein the step of adding an oxygen-containing gas to react with the remaining portion of said hot char under suppressed combustion conditions to gasify the carbon (C) in said char to form additional CO which increases the CO content in said $N_2/2CO$ gas to result in a newly formed $N_2/2CO$ gas with an increased ratio of CO in relation to $N_2$ is further characterized by the step of dividing this newly formed $N_2/2CO$ gas into two sections, a first section of gas and a second section of gas.

12. The method as set forth in claim 11 wherein said first section of gas is utilized as a combustion fuel to generate electric power.

13. The method as set forth in claim 12 includes the generation of electric power via the combined cycle mode.

14. The method as set forth in claim 12 wherein said first section of gas is utilized as a combustion fuel to generate electric power is further characterized by the step of collecting the product of combustion which constitutes a waste gas in the form of a flue gas containing $N_2$ and $CO_2$.

15. The method as set forth in claim 14 includes the step of collecting the flue gas containing $N_2$ and $CO_2$ produced when generating electric power.

16. The method as set forth in claim 14 and claim 15 wherein said flue gas containing $N_2$ and $CO_2$ is reacted with hot char as claimed in step 3 of claim 1.

17. The method as set forth in claim 11 wherein said second section of gas is directed to a processing vessel containing a solid catalyst for the conversion of said gas into $C_2N_2$.

18. The method as set forth in claim 17 comprising the moderating of the temperature of the gas prior to directing it to said processing vessel.

19. The method as set forth in claim 17 wherein said $C_2N_2$ is chilled and liquefied in order to bring it to a state where separation can take place between the $C_2N_2$ and the unreacted gases that have not been converted to $C_2N_2$ in the processing vessel.

20. The method as set forth in claim 19 comprising the separation of liquefied $C_2N_2$ from the unreacted gases.

21. The method as set forth in claim 20 wherein the liquefied $C_2N_2$ is vaporized into a gaseous state prior to being processed into a fertilizer.

22. The method as set forth in claim 21 is further characterized by the step of feeding the $C_2N_2$ in gaseous state conjunctively with a liquid catalyst into a reactor to convert the $C_2N_2$ to oxamide which is collected in a settling tank, filter pressed and dried.

23. The method as set forth in claim 20 wherein said unreacted gases are recycled.

24. The method as set forth in claim 21 wherein said $C_2N_2$ vaporized into a gaseous state is further characterized by having said $C_2N_2$ in gaseous state co-act with a liquid catalyst in such a way that the $C_2N_2$ gas ascends and the liquid catalyst descends within a reactor in order to enhance the conversion of the $C_2N_2$ into oxamide.

25. The method as set forth in claim 24 wherein said catalyst is further characterized by the step of heating said catalyst prior to its introduction into said reactor.

26. The method as set forth in claim 12 being further characterized by the step of extracting mercury from said fuel prior to combusting it.

27. The method as set forth in claim 6 wherein the step of subjecting said gas to a cleanup is further characterized by the step of removing sulfur from said gas.

28. The method as set forth in claim 17 wherein said solid catalyst is regenerated to extend its useful life.

29. The method as set forth in claim 1 wherein the step of cleaning said newly formed $N_2/2CO$ gas is further characterized by the step of removing sulfur from it.

30. The method as set forth in claim 1 wherein said fuel is coal.

31. A method for processing a liquid fuel containing hydrocarbons wherein said fuel or a portion thereof is converted to thermal energy while producing a waste gas made up of nitrogen ($N_2$) and carbon dioxide ($CO_2$), comprising the following steps:
producing a hot char by devolatilizing said liquid fossil fuel over a hot sorbent while producing a volatile matter having a high hydrogen content;
reacting said waste gas containing said $N_2$ and said $CO_2$ with said hot char to cause the conversion of said $CO_2$ to carbon monoxide (CO) by using said hot char as a reductant to form a $N_2/2CO$ gas;
cleaning said $N_2/2CO$ gas of extraneous material to produce a cleaned $N_2/2CO$ gas;
dividing said cleaned $N_2/2CO$ gas into two portions: a first portion and a second portion;
converting said first portion of $N_2/2CO$ gas into thermal energy via combustion while producing a newly formed $N_2/2CO_2$;
passing said second portion of $N_2/2CO$ gas through a solid catalyst to produce a compound of carbon (C) and nitrogen ($N_2$);
feeding said compound of C and $N_2$ through a liquid catalyst to convert it into a fertilizer; and
recycling said newly formed $N_2/CO_2$ to react with additional hot char to reduce the newly formed $CO_2$ into CO for further utilitarian applications, instead of sequestering said $CO_2$ into a geologic formation for storage.

32. The method as set forth in claim 31 wherein said liquid fuel is bitumen.

33. The method as set forth in claim 32 wherein said bitumen is cracked and desulfurized in a single operation yielding a volatile matter consisting of several desulfurized fractions which mainly comprise a high hydrogen gas, light naphtha, heavy naphtha, light oils, atmospheric gas oil and residuum.

34. The method as set forth in claim 33 wherein said residuum is recycled with said bitumen feed to be devolatilized, cracked and desulfurized in a single vessel.

35. The method as set forth in claim 31 wherein the step of producing a hot char by devolatilizing said liquid fuel over a hot sorbent is further characterized by the step of impregnating carbon in said sorbent during the devolatilization of said liquid fossil fuel to make it a carbon-laden sulfidated sorbent.

36. The method as set forth in claim 35 wherein said carbon-laden sulfidated sorbent is regenerated by oxidizing said carbon under suppressed combustion to produce a CO reducing gas and elemental sulfur.

37. The method as set forth in claim 35 wherein a flue gas consisting of $N_2/CO_2$ is reduced by said carbon in said sorbent which converts $N_2/CO_2$ flue gas into $N_2/2CO$ fuel gas, a valuable by-product.

38. The method as set forth in claim 37 wherein said $N_2/2CO$ fuel gas is divided into two parts, with the first part serving as a fuel gas and the second part serving as a chemical feedstock.

39. The method as set forth in claim 38 wherein said first part serving as a fuel gas is used for conversion into thermal energy.

40. The method as set forth in claim 39 wherein said thermal energy is used to raise steam in a boiler while producing a flue gas made up of $N_2/CO_2$ which is directed to a regenerator to be converted to $H_2/2CO$ by reaction with hot char.

41. The method as set forth in claim 38 wherein said second part serving as a chemical feedstock is converted to cyanogen ($C_2N_2$).

42. The method as set forth in claim 41 is further characterized by converting said $C_2N_2$ into a fertilizer consisting of a compound made up of CO, $N_2$ and $H_2$.

43. The method as set forth in claim 42 wherein said compound made up of CO, $N_2$ and $H_2$ comprises a fertilizer whose denomination is oxamide $(CONH_2)_2$.

44. The method as set forth in claim 42 wherein said compound made up of CO, $N_2$ and $H_2$ comprises a fertilizer whose denomination is urea: $CO(NH_2)_2$.

45. The method as set forth in claim 35 wherein the sulfur contained in said carbon-laden sulfidated sorbent is recovered as elemental sulfur during the regeneration of said sorbent.

46. The method as set forth in claim 45 wherein said sorbent is lime (CaO) which is circulated from a devolatilizer/cracker/desulfurizer to a regenerator that serves to remove the sulfur and carbon from the sorbent and feed a hot regenerated sorbent back to said devolatilizer/cracker/desulfurizer while at the same time using the carbon within the regenerator to convert $CO_2$ to 2CO during regeneration of the sorbent.

\* \* \* \* \*